(12) United States Patent
Ando et al.

(10) Patent No.: US 6,738,203 B2
(45) Date of Patent: May 18, 2004

(54) OPTICAL POWER LIMITING MATERIAL

(75) Inventors: Masanori Ando, Ikeda (JP); Kenji Kamada, Ikeda (JP); Kohei Kadono, Ikeda (JP); Koji Ohta, Ikeda (JP); Keiko Tawa, Ikeda (JP); Takeyuki Tanaka, Ikeda (JP)

(73) Assignee: Secretary, Agency of Industrial Science and Technology (JP)

( * ) Notice: Subject to any disclaimer, the term of this patent is extended or adjusted under 35 U.S.C. 154(b) by 0 days.

(21) Appl. No.: 09/746,475

(22) Filed: Dec. 21, 2000

(65) Prior Publication Data

US 2002/0024752 A1 Feb. 28, 2002

(30) Foreign Application Priority Data

Aug. 31, 2000 (JP) ........................................ 2000-262188

(51) Int. Cl.[7] ................................................. G02B 5/22
(52) U.S. Cl. ..................... 359/885; 359/359; 359/360; 359/241; 359/614; 359/738; 252/582
(58) Field of Search ................................. 359/885, 241, 359/738, 614, 888, 360; 252/582; 351/213

(56) References Cited

U.S. PATENT DOCUMENTS 5,172,278 A * 12/1992 Tutt ........................... 359/885
5,173,811 A * 12/1992 Gumbs ....................... 359/885

OTHER PUBLICATIONS

Francisco Aranda, et al., "Optical power limiting in ZnO crystals", SPIE vol. 3798, pp. 22–31, Jul. 1999.*
Masanori Ando, Kohei Kadono, Kenji Kamada and Koji Ohta; Third–Order Nonlinear Optical Responses of Nano-particulate Fe2O3 and CuO Films; Nonlinear Optics, 2000, vol. 24, pp. 123–127; Sep., 2000.
Abstracts from the First International Workshop on Optical Power Limiting, Cannes, France, (1998) pp. 1–63.

* cited by examiner

Primary Examiner—Cassandra Spyrou
Assistant Examiner—Leo Boutsikaris
(74) Attorney, Agent, or Firm—Knobbe, Martens, Olson & Bear, LLP

(57) ABSTRACT

A main object of the present invention is to provide a novel optical power limiting material of high performance being less susceptible to damages caused by heat occurring when an intensified laser beam is irradiated, having reversible characteristic and exhibiting a stable optical power limiting effect; production of the optical power limiting is simple and economical.

The optical power limiting material of the present invention comprises a transparent substrate and an oxide(s) of at least one metal selected from the group consisting of of Ti, V, Cr, Mn, Fe, Co, Ni, Cu, Zn, Nb, Mo, Ru, In, Sn, Sb, Ta, W, Re, Os, Ir and Bi.

25 Claims, 3 Drawing Sheets

OPTICAL POWER LIMITING MATERIAL

The present invention relates to an optical power limiting material (optical limiting material) which responds to strong light rapidly, more specifically, a novel material which is suitable as a light shutter or a light fuse for protecting naked eyes, sensors, etc. from a strong laser beam or, in the case where an excessively strong laser beam is input into an optical device, for preventing optical device components from being optically damaged by blocking the laser beam.

Materials having an effect of transmitting light well when incident light has low intensity, while regulating transmitted light intensity lower than a certain value when incident light has high intensity, i.e., materials having an optical power limiting effect are known in the art. The optical power limiting materials can be generally divided into two types; one having a reversible response characteristic and the other having a irreversible response characteristic.

The optical power limiting material having the reversible characteristic can be used repeatedly since transmitted light intensity of the material can be returned to the original value even after incident light intensity is increased and then decreased to the original value. On the other hand, the material having the irreversible response characteristic cannot be used repeatedly but only for a single operation since the material has the properties of retaining the same transmitted light intensity even when incident light intensity is increased and then decreased to the original value. Recently, the optical power limiting material having reversible response characteristic has been actively studied, since such optical power limiting material has a greater industrial applicability and usability as compared with the material having irreversible response characteristic.

Rapid response, i.e., properties of responding immediately to strong light input, are required for the protection of naked eyes, sensors, optical device components, etc. from the strong light input. In the case where weak light is irradiated continuously for a long time, it is required that transmitted light intensity remains unchanged. These two are the basic requirements for the optical power limiting material.

Organic materials such as porphyrin derivatives, fullerene, etc. have heretofore been found as possible choices for the materials exhibiting a relatively good optical power limiting effect rapidly.

However, properties of these organic materials are not satisfactory for practical use. For example, since the organic materials do not have satisfactorily high heat resistance, the molecular structure thereof may change irreversibly due to a temperature rise occurring in the case of absorbing extremely strong light or the characteristic thereof may change irreversibly due to thermal decomposition, thereby to lose the optical power limiting effect. Further, the organic materials have such problems that the production thereof is relatively complicated and they can be produced by only a small scale.

In turn, a photochromic material, which reversibly changes in color in response to light, has been investigated as a representative material having a light response function. However, the photochromic material does not satisfy the requirements of the optical power limiting material since the photochromic material is slow in response speed and the light transmitting properties thereof are changed gradually due to responding to week light. Thus, there is a demand for a novel high-performance optical power limiting material.

The problems detected with the conventional materials exhibiting relatively satisfactory optical power limiting properties reversibly are that the insufficient heat resistance with respect to irradiation with a strong laser beam and the complicated and expensive production process. Accordingly, there is a demand for a high-performance optical power limiting material which has a high stability, and can be produced simply and economically (see, First International Workshop on Optical Power Limiting, Cannes (France), 1998).

In view of the present situation of the optical power limiting materials as explained above, a main object of the present invention is to provide a novel high-performance optical power limiting material which is unsusceptible to damages otherwise caused by heat occurring when a strong laser beam is irradiated thereon, has reversible characteristic, exhibits a stable optical power limiting effect and can be produced simply and economically.

The inventors have carried out extensive researches and found that an optical power limiting material comprising a transparent substrate and a specific metal oxide can achieve the above objects, thereby to accomplish the present invention.

The present invention provides the following optical power limiting material and uses thereof.

1. An optical power limiting material comprising a transparent substrate and an oxide of at least one metal selected from the group consisting of Ti, V, Cr, Mn, Fe, Co, Ni, Cu, Zn, Nb, Mo, Ru, In, Sn, Sb, Ta, W, Re, Os, Ir and Bi (except for $VO_2$).
2. The optical power limiting material according to item 1, wherein the transparent substrate is at least one selected from the group consisting of glass, $SiO_2$, $Al_2O_3$, ZnO, $ZrO_2$, ZnSe and quartz.
3. The optical power limiting material according to item 2, wherein the transparent substrate is at least one selected from the group consisting of $SiO_2$, $Al_2O_3$ and $ZrO_2$.
4. The optical power limiting material according to item 1, wherein the transparent substrate is porous substance.
5. The optical power limiting material according to item 1, wherein the transparent substrate is at least one selected from the group consisting of an acrylic resin, a polycarbonate resin, a polystyrene resin and a polyvinyl resin.
6. The optical power limiting material according to item 1, wherein the metal oxide is at least one selected from the group consisting of TiO, $Ti_2O_3$, $TiO_2$, VO, $V_2O_3$, $V_2O_5$, CrO, $Cr_2O_3$, $CrO_2$, $Cr_2O_5$, $CrO_3$, $CrO_5$, MnO, $Mn_3O_4$, $Mn_2O_3$, $MnO_2$, $MnO_3$, $Mn_2O_7$, FeO, $Fe_3O_4$, $Fe_2O_3$, CoO, $Co_2O_3$, $Co_3O_4$, $CoO_2$, NiO, $Ni_3O_4$, $Ni_2O_3$, $NiO_2$, $Cu_2O$, CuO, ZnO, NbO, $Nb_2O_3$, $NbO_2$, $Nb_2O_5$, MoO, $Mo_2O_3$, $MoO_2$, $Mo_2O_5$, $MoO_3$, RuO, $Ru_2O_3$, $RuO_2$, $RuO_4$, $In_2O$, $In_2O_3$, SnO, $SnO_2$, $Sb_2O_3$, $Sb_2O_4$, $Sb_2O_5$, $TaO_2$, $Ta_2O_3$, $Ta_2O_5$, $WO_2$, $W_2O_5$, $WO_3$, $Re_2O$, ReO, $Re_2O_3$, $ReO_2$, $Re_2O_5$, $ReO_3$, $Re_2O_7$, OsO, $Os_2O_3$, $OsO_2$, $OsO_3$, $OsO_4$, $Ir_2O_3$, $IrO_2$, BiO, $Bi_2O_3$ and $Bi_2O_5$.
7. The optical power limiting material according to item 1, wherein the metal oxide is at least one selected from the group of composite oxides consisting of $XCr_2O_4$ (X=Mg, Zn, Cu, Mn, Fe, Co, Ni), $Na_2SnO_3$, $Pb_2SnO_4$, $Bi_2Sn_2O_7$, $Na_3VO_4$, $MVO_4$ (M=Nd, Sm, Eu, Y, Fe, Cr), $VOMo_4$, $MV_2O_4$ (M=Mg, Mn, Co, Zn, Cu), $VM_2O_4$ (M=Mg, Co, Zn), $VMn_2O_4$, $V_2MoO_8$, $A_xV_2O_5$ (0<x<1, A=Li, K, Na, Cu, Ag, Ca, Cd, Pb), $ZrV_2O_7$, $MVO_3$, (M=K, Fe, Ti, Cr, Ni, Mg, Ca, La, Y, Sc), $H_4(PMo_{11}VO_{40})$, $H_5(PMo_{10}V_2O_{40})$, $H_6(PMo_9V_3O_{40})$, $H_4(PW_{11}VO_{40})$, $H_6(PW_6V_3O_{41})$, $Bi_2O_3 \cdot xMoO_3$ (x=4, 3, 2, 1, ½, 1/3, 1/10), $Bi_2O_3 \cdot xWO_3$ (x=2 to 3, 1, ½ to ⅕, ½), $xBi_2O_3 \cdot Sb_2O_5$ (x=1, 3), $Bi_9PMo_{12}O_{52}$, $Fe_2(MoO_4)_3$, $(MoO_3)_{1.0}(Cr_2O_3)_{0.75}$, $A_xWO_3$ (0<x<1, A=H, Li, K, Na, Rb, Ca, Cu, Ag, In, Tl, Sn, Pb, rare earth element), $LiTi_2O_4$, $MnCo_2O_4$, $NiCo_2O_4$ and $NiMnCo_4O_8$.

8. The optical power limiting material according to item 1, wherein the metal oxide forms a thin film on a surface of the transparent substrate in the form of particles having a mean particle diameter of not more than 1 μm.

9. The optical power limiting material according to item 1, wherein the metal oxide forms a thin film on a surface of the transparent substrate in the form of particles having a mean particle diameter of not more than 1 μm, and a ratio of a number of metal atoms in the metal oxide to a number of non-oxygen atoms in the oxide comprised in the transparent substrate or a number of monomer units composing a polymer ranges from 1:1 to 1:100.

10. The optical power limiting material according to item 1, wherein the metal oxide is dispersed in the transparent substrate in the form of particles having a mean particle diameter of not more than 1 μm.

11. The optical power limiting material according to item 1, wherein the metal oxide is dispersed in the transparent substrate in the form of particles having a mean particle diameter of not more than 1 μm, and a ratio of a number of metal atoms in the metal oxide to a number of non-oxygen atoms in the oxide comprised in the transparent substrate or a number of monomer units composing a polymer ranges from 1:1 to 1:100.

12. The optical power limiting material according to claim 1, which further comprises a transparent additive component.

13. The optical power limiting material according to claim 12, wherein the transparent additive component is at least one selected from the group consisting of $SiO_2$, $Al_2O_3$, $ZrO_2$, ZrO, ZnSe, an acrylic resin, a polycarbonate resin, a polystyrene resin and a polyvinyl resin.

14. The optical power limiting material according to claim 12, wherein the transparent additive component is at least one selected from the group consisting of $SiO_2$, $Al_2O_3$, $ZrO_2$, an acrylic resin, a polycarbonate resin, a polystyrene resin and a polyvinyl resin.

15. A light shutter comprising the optical power limiting material according to item 1.

16. A light shutter characterized in that the optical power limiting material according to item 1 is located in the vicinity of a focal point of a condenser lens for condensing incident light.

17. A light fuse comprising the optical power limiting material according to item 1.

18. A light fuse characterized in that the optical power limiting material according to item 1 is located in the vicinity of a focal point of a condenser lens for condensing incident light.

Figure 1:
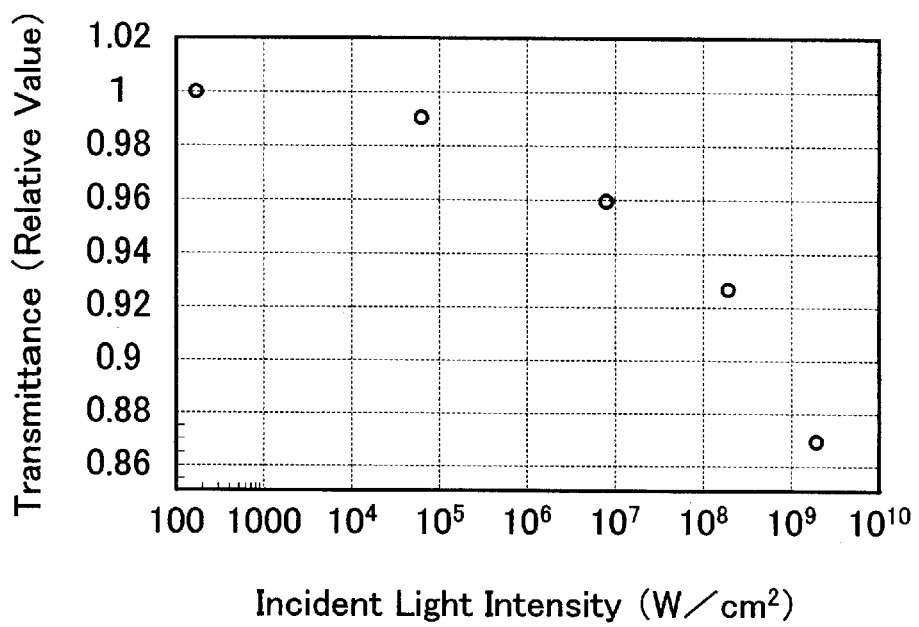
FIG. 1 shows relationship between intensity of an incident laser beam and transmission of the thin film prepared in Example 1 of the present invention in the case of irradiating a laser beam having a wavelength of 532 nm and a pulse duration of 35 ps onto the thin film.

The optical power limiting material of the present invention is basically characterized by comprising a transparent substrate and an oxide(s) of at least one metal selected from the group consisting of Ti, V, Cr, Mn, Fe, Co, Ni, Cu, Zn, Nb, Mo, Ru, In, Sn, Sb, Ta, W, Re, Os, Ir and Bi (except for $VO_2$).

More specifically, the optical power limiting material of the invention may have the following structures.

(1) A surface of a transparent substrate is covered with a thin film comprising metal oxide particles.

(2) A surface of a transparent substrate is covered with a composite thin film comprising metal oxide particles and a transparent additive component.

(3) Metal oxide particles are dispersed inside a porous transparent substrate.

(4) Metal oxide particles and a transparent additive component are dispersed inside a porous transparent substrate.

The transparent substrate to be used in the present invention is not limited as long as the optical power limiting material comprising the metal oxide shows a desired non-linear absorption coefficient (β). Generally, optical transparency of the transparent substrate having a thickness of 0.1 mm is about 70 to about 100% as transmission with respect to light having a wavelength of about 400 to about 2000 nm. Examples of the transparent substrate to be used in the invention include transparent oxides such as glass comprising $SiO_2$ as a main component, quartz, sapphire comprising $Al_2O_3$ (white sapphire containing no $Fe^{2+}$, $Fe^{3+}$, $Ti^{4+}$, etc.), ZnO, $ZrO_2$; transparent polymer materials such as an acrylic resin, a polycarbonate resin, a polystyrene resin, a polyvinyl resin; transparent inorganics such as ZnSe; and the like.

The transparent substrate may be a porous substance such a porous glass substrate (e.g. porous glass comprising $SiO_2$ as a main component), porous polymer substrate and the like. The porous substance usable as the substrate is not limited by the characteristics such as a specific surface area, porosity, an average diameter, etc. as long as the optical power limiting material comprising the porous substance exhibits desired transparency. The specific surface area of the porous transparent substrate may typically be about 10 to about 500 m²/g, preferably about 50 to about 300 m²/g. The porosity of the porous transparent substrate may typically be about 5 to about 70%, preferably about 10 to about 50%. The average pore diameter of the porous transparent substrate may typically be about 2 to about 100 nm, preferably about 2 to about 50 nm.

Form of the transparent substrate is not limited in the present invention, and it may be varied depending on the form of the optical power limiting material; examples of the form include a plate, a waveguide and the like.

Thickness of the transparent substrate may be varied depending on the application of the optical power limiting material, and it may typically be about 0.05 to about 3 mm, preferably about 0.1 to about 1 mm.

The nonlinear absorption coefficient ($\beta$) may typically be about $10^{-7}$ to about $10^{-4}$ cm/W, preferably about $10^{-6}$ to about $10^{-4}$ cm/W. The nonlinear absorption coefficient ($\beta$) is defined by the following differential equation:

$$dI/dz = -\alpha I - \beta I^2$$

(wherein, "I" represents light intensity inside a thin film at an arbitrary distance in the perpendicular direction from plane of incidence; "z" represents an axis in the perpendicular direction of the thin film; "$\alpha$" represents a linear absorption coefficient; and "$\beta$" represents a nonlinear absorption coefficient).

The optical power limiting material of the present invention may comprise forming directly on the transparent substrate a thin film comprising an oxide(s) of at least one metal selected from the group consisting of Ti, V, Cr, Mn, Fe, Co, Ni, Cu, Zn, Nb, Mo, Ru, In, Sn, Sb, Ta, W, Re, Os, Ir and Bi (except for $VO_2$), or may comprise fixing the metal oxide inside pores of the transparent substrate comprising porous substance. The metal oxide may be porous.

The metal oxide usable in the present invention may be an oxide(s) of a single metal or plural metals, or a composite metal oxide(s). Oxidation state of the metal oxide is not limited in the present invention. The metal oxide may be used solely or in combination of two or more.

Examples of the oxide(s) of a single metal include metal oxides in various metal oxidation states such as $TiO$, $Ti_2O_3$, $TiO_2$, $VO$, $V_2O_3$, $V_2O_5$, $CrO$, $Cr_2O_3$, $CrO_2$, $Cr_2O_5$, $CrO_3$, $CrO_5$, $MnO$, $Mn_3O_4$, $Mn_2O_3$, $MnO_2$, $MnO_3$, $Mn_2O_7$, $FeO$, $Fe_3O_4$, $Fe_2O_3$, $CoO$, $Co_2O_3$, $Co_3O_4$, $CoO_2$, $NiO$, $Ni_3O_4$, $Ni_2O_3$, $NiO_2$, $Cu_2O$, $CuO$, $ZnO$, $NbO$, $Nb_2O_3$, $NbO_2$, $Nb_2O_5$, $MoO$, $Mo_2O_3$, $MoO_2$, $Mo_2O_5$, $MoO_3$, $RuO$, $Ru_2O_3$, $RuO_2$, $RuO_4$, $In_2O$, $In_2O_3$, $SnO$, $SnO_2$, $Sb_2O_3$, $Sb_2O_4$, $Sb_2O_5$, $TaO_2$, $Ta_2O_3$, $Ta_2O_5$, $WO_2$, $W_2O_5$, $WO_3$, $Re_2O$, $ReO$, $Re_2O_3$, $ReO_2$, $Re_2O_5$, $ReO_3$, $Re_2O_7$, $OsO$, $Os_2O_3$, $OsO_2$, $OsO_3$, $OsO_4$, $Ir_2O_3$, $IrO_2$, $BiO$, $Bi_2O_3$ and $Bi_2O_5$. Preferred among the above examples are $V_2O_5$, $Cr_2O_3$, $Mn_3O_4$, $MnO_2$, $Fe_3O_4$, $Fe_2O_3$, $CoO$, $Co_3O_4$, $Cu_2O$, $CuO$, $ZnO$, $In_2O_3$, $SnO_2$, $WO_3$, $IrO_2$, $Bi_2O_3$ and the like.

Examples of the composite oxide(s) include $XCr_2O_4$ (X=Mg, Zn, Cu, Mn, Fe, Co, Ni), $Na_2SnO_3$, $Pb_2SnO_4$, $Bi_2Sn_2O_7$, $Na_3VO_4$, $MVO_4$ (M=Nd, Sm, Eu, Y, Fe, Cr), $VOMo_4$, $MV_2O_4$ (M=Mg, Mn, Co, Zn, Cu), $VM_2O_4$ (M=Mg, Co, Zn), $VMn_2O_4$, $V_2MoO_8$, $A_xV_2O_5$ (0<x<1, A=Li, K, Na, Cu, Ag, Ca, Cd, Pb), $ZrV_2O_7$, $MVO_3$, (M=K, Fe, Ti, Cr, Ni, Mg, Ca, La, Y, Sc), $H_4(PMo_{11}VO_{40})$, $H_5(PMo_{10}V_2O_{40})$, $H_6(PMo_9V_3O_{40})$, $H_4(PW_{11}VO_{40})$, $H_6(PW_6V_3O_{41})$, $Bi_2O_3 \cdot xMoO_3$ (x=4, 3, 2, 1, ½, ⅓, 1/10), $Bi_2O_3 \cdot xWO_3$ (x=2 to 3, 1, ½ to ⅕, 1/10), $xBi_2O_3 \cdot Sb_2O_5$ (x=1, 3), $Bi_9PMo_{12}O_{52}$, $Fe_2(MoO_4)_3$, $(MoO_3)_{1.0}$ $(Cr_2O_3)_{0.75}$, $A_xWO_3$ (0<x<1, A=H, Li, K, Na, Rb, Ca, Cu, Ag, In, Tl, Sn, Pb, rare earth element), $LiTi_2O_4$, $MnCo_2O_4$, $NiCo_2O_4$ and $NiMnCo_4O_8$. Examples of the rare earth element included in the composite oxide are Sc, Y and lanthanoid: La, Ce, Pr, Nd, Pm, Sm, Eu, Gd, Tb, Dy, Ho, Er, Tm, Yb and Lu. Examples of more preferred composite oxide are $XCr_2O_4$, $Na_3VO_4$, $MVO_4$, $VOMo_4$, $VM_2O_4$, $VMn_2O_4$, $V_2MoO_8$, $A_xV_2O_5$, $ZrV_2O_7$, $MVO_3$, $Fe_2(MoO_4)_3$, $(MoO_3)_{1.0}$ $(Cr_2O_3)_{0.75}$, $A_xWO_3$, $MnCo_2O_4$, $NiCo_2O_4$, $NiMnCo_4O_8$ and the like.

In the case of forming a thin film using an metal oxide, a thickness thereof is not limited and may be varied depending on the application of the optical power limiting material. If the film is too thick, light transmittance thereof will be too low even when such weak light that does not damage sensors and naked eyes is made incident to the film, thereby degrading usability of the optical power limiting material. The thickness of the metal oxide thin film may be varied depending on density of the thin film. For example, in the case of using a dense metal oxide thin film such as those formed by sputtering deposition, laser MBE or the like, the density (volumetric percentage of metal oxide in the thin film excluding the void volume) may be about 0.7 to about 1, and the thickness of the thin film may typically be about 10 nm to about 1 $\mu$m, preferably about 10 to about 500 nm. In turn, in the case of forming the thin film by a method wherein a solution is applied on a substrate followed by thermal decomposition, a method wherein a dispersion of metal oxide particles is applied directly on a substrate or like methods, the formed thin film has relatively low density (density thereof is about 0.3 to about 0.9) and, therefore, a relatively thicker thin film, whose thickness may typically be about 20 nm to about 5 $\mu$m, preferably about 20 nm to about 2 $\mu$m, can be used for the optical power limiting material. Size of the metal oxide particle is not limited, and may be varied according to the thickness of the thin film and so on. The size of the metal oxide particle may typically be, as a mean particle diameter, not more than 1 $\mu$m, preferably about 2 to about 100 nm.

In the present invention, a particle size distribution of the metal oxide particles may preferably be such that a proportion of particles each having a diameter in the range of ±50% of the mean particle diameter is about 50 to about 100%, more preferably about 80 to about 100% in the thin film and also in pores of a porous substrate which will be described later. The mean particle diameter can be confirmed by means of a scanning electron microscope or a transmission electron microscope, or by calculation according to the Scherrer's equation using a line width of the X-ray diffraction line.

Form of the optical power limiting material may be selected depending on the application thereof; examples of the form may be a plate, a waveguide, or the like.

In the case of fixing the metal oxide in pores of a porous substrate, a fixed weight ratio (weight ratio of fixed metal oxide to substrate) may typically be about 5 to about 70 wt. %, preferably about 10 to about 50 wt. %. The metal oxide fixed in the pores of the substrate is typically in the form of particles; the mean particle idiameter of the metal oxide particles may typically be about 2 to about 100 nm, preferably about 2 to about 50 nm.

In the present invention, the metal oxide particles may be either of polycrystal or of monocrystal in both the cases where a metal oxide thin film is formed on a substrate and where metal oxide particles are fixed inside a porous substrate.

The optical power limiting material of the present invention may further comprise a transparent additive component. Optical transparency of the additive component is not limited as long as the optical power limiting material comprising the additive component can achieve a desired nonlinear absorption coefficient ($\beta$).

The transparent additive component itself does not necessarily exhibit a strong optical power limiting effect as long as it has high optical transparency and the following function(s) as being composited with the metal oxide:
(i) facilitating the metal oxide to form a thin film;
(ii) improving optical power limiting effect of the metal oxide and/or
(iii) increasing structural stability and mechanical strength of the thin film. The transparent additive component may preferably be low in the light absorption rate and high in the optical transparency as compared with the metal oxide. Addition of such component enables to obtain an optical power limiting material which is increased in the temperature only slightly even when an extremely strong laser beam is irradiated thereon.

The transparent additive component to be used in the present invention is not limited and include, for example, transparent oxides such as glass comprising $SiO_2$ as a main component, quartz, sapphire comprising $Al_2O_3$, $ZrO_2$, ZrO and the like; transparent organic polymer materials such as an acrylic resin (e.g., polymethylmethacrylate, etc.), a polycarbonate resin, a polystyrene resin, a polyvinyl resin; ZnSe; and the like. Preferred among the above examples are glass comprising $SiO_2$ as a main component, quartz, sapphire comprising $Al_2O_3$, $ZrO_2$ and the like; transparent organic polymer materials such as an acrylic resin (e.g., polymethylmethacrylate, etc.), a polycarbonate resin, a polystyrene resin, a polyvinyl resin and the like.

A ratio of a number of metal atoms in a metal oxide to a number of non-oxygen atoms in an oxide as the transparent additive component or a number of monomer units composing the polymer may typically be about (1:0.01) to (1:100), preferably about (1:0.1) to (1:10). A satisfactory compositing effect cannot be achieved if the proportion of the transparent additive component is too small, while an improvement in characteristics of the optical power limiting material accompanying the increase in the transparent additive component will be diminished if the proportion is too large.

The composite thin film may be formed by dispersing the metal oxide as particles in the transparent additive component.

In the case of forming the composite thin film on a transparent substrate by using an organic polymer as the transparent additive component, a thickness of the thin film is not limited and may suitably be varied depending on the application and so on. Also in this case, if the film is too thick, the light transmission rate thereof is maintained low even when incident light is too weak to damage sensors or naked eyes, thereby to degrade usability of the optical power limiting material. In comparison with the thin film comprising only the metal oxide, a preferable thickness of the composite thin film is increased in proportion to the content of the transparent additive component. For example, in the case where the ratio of a number of metal atoms in a metal oxide to a number of non-oxygen atoms in an oxide contained in a transparent additive component or to a number of monomer units composing a polymer is 1:1, the preferable thickness of the composite film may be twice as that of the metal oxide thin film; in the case of the ratio is 1:10, the preferable thickness of the composite film may be 10 times as that of the metal oxide thin film.

Reasons why the optical power limiting material of the present invention has the nonlinear absorption characteristic are unclear, but it is assumed that the nonlinear absorption characteristic be attributable to the following principles. The metal oxides to be used in the invention each have a continuous absorption band extending to a wide range of ultraviolet-visible-near infrared. Basically, such wide absorption spectrum is derived from the semiconducting electronic structure of the metal oxide. The metal oxide possessing semiconductive properties has its light absorption band typically in the ultraviolet wavelength range, which corresponds to an interband transition from the highest level in the valence band to the lowest level in the conduction band. In the longer wavelength region, the metal oxide has a light absorption band which is attributable to the gaps between the numerous levels existing in the valence and conduction bands or in a forbidden band. These light absorption bands overlaps to produce a wide absorption band extending from visible region to near infrared wavelength region. These absorption bands vary depending on chemical composition and crystal structure of the metal oxide.

It is considered that the distribution of the size of the metal oxide particles comprised in the metal oxide thin film contributes to broaden the absorption spectrum. In the case of forming a thin film using a metal oxide, the metal oxide particles are aggregated so as to form the thin film. Generally, when a substance having semiconductive properties is size-reduced to have a particle size of several tens of nanometers or less, a width of a forbidden band become larger than that of a bulk semiconductor which cannot be size-reduced, and an absorption spectrum of the size-reduced substance is shifted to the shorter wavelength region as compared with the bulk substance.

According to the optical power limiting material of the present invention, the size of the metal oxide particles in a single metal oxide thin film may typically varies from about 2 nm to about 1 $\mu$m, preferably from about 2 nm to about 100 nm. Therefore, it is considered that the thin film of the invention has the absorption spectrum broader than that of a film comprising metal oxide particles having a uniform size.

The two-photon absorption is considered to be one of the reasons for occurrence of a transmittance change depending on incident light intensity. Generally, when incident light has low intensity, one-photon absorption is observed and the two-photon absorption rarely happens. Since the two-photon absorption is proportional to the square of incident light intensity, both of the one-photon absorption and the two-photon absorption are observed when the incident light has strong intensity.

Because the two-photon absorption readily occurs in the optical power limiting material of the present invention, the transmission is reduced when the incident light intensity is increased and such behaviour is assumed to cause the reversible response characteristic with respect to the change in the incident light intensity, i.e., the nonlinear absorption characteristic.

A process of changes in optical response and absorption in the photochromic compound, which is a conventional optically responsive material, is accompanied by a molecular structural change; therefore, the process proceeds slower as compared with the two-photon absorption process. Thus, it is considered that the optical power limiting material of the present invention can readily respond to a strong incident laser beam and exhibits necessary optical power limiting effect owing to the nonlinear absorption characteristic which is attributable to the two-photon absorption process.

In general, influence of a temperature rise in a material caused by light irradiation can be ignored until a hundred and several tens of picoseconds after the onset of light irradiation. It is assumed that the two-photon absorption contributes to the present optical power limiting material for achieving the optical power limiting effect when a pulsed laser beam having a pulse duration of picosecond order is irradiated thereon. In the case of irradiating a pulsed laser or a continuous oscillating laser having a pulse duration of not less than a nanosecond, a temperature rise in the optical power limiting material caused by the light irradiation contribute to the optical power liming effect in addition to the two-photon absorption. It is advantageous to use the metal oxide semiconductor for achieving the optical power limiting effect by making use of the increase in the light absorption accompanying the temperature rise occurring in absorbing the incident light since many of them are increased in carrier concentration, which causes the light absorption of ultraviolet-visible-near infrared region, with the increase in the temperature thereof.

Such phenomenon is observed not in all types of metal oxides, but in the metal oxides satisfying the requirements of (a) having absorption band in the wavelength of the irradiated laser beam, (b) having semiconductive properties and (c) having a large two-photon absorption or being largely increased in the light absorption caused by a temperature rise, etc. The thin film comprising an oxide(s) of at least one metal selected from the group consisting of Ti, V, Cr, Mn, Fe, Co, Ni, Cu, Zn, Nb, Mo, Ru, In, Sn, Sb, Ta, W, Re, Os, Ir and Bi as described above satisfies these 3 requirements and exhibits a remarkable optical power limiting effect.

The optical power limiting material of the present invention can be prepared by conventional methods. For example, in the case of forming a thin film on a transparent substrate using a metal oxide, optionally together with a transparent additive component, there can be employed a method wherein a so-called gas phase deposition method such as sputtering deposition, vacuum deposition, laser MBE, CVD or the like using a metal oxide or a precursor thereof (and, when necessary, a transparent additive component or a precursor thereof) as a target; a method wherein a metal oxide precursor solution is applied on a substrate together with, when necessary, a transparent additive component or a precursor thereof, followed by thermal decomposition (generally, heated under an oxidizing atmosphere such as an air atmosphere, at about 300 to about 800° C., for about 30 minutes to about 4 hours); a method wherein a metal oxide particle dispersion and, when necessary, a transparent additive component dispersion (or solution) is/are applied directly on a substrate by spin coating, dip coating, spray coating, etc., followed by drying and then post-treatments, or like methods. Mean particle diameter of the metal oxide particles used in the spin coating, dip coating, spray coating, etc. is not limited, but usually be about 2 nm to about 1 $\mu$m, preferably about 2 to about 100 nm.

Size of the metal oxide particles comprised in the thin film is usually the same as that of material particles; however, it may be larger than that of the material particles in the case where aggregation, sintering, etc. of the particles occurs in the course of coating, drying, post-treatment and the like. In such cases, material particles having the mean particle diameter lower than the predetermined range may suitably be used so that the mean particle diameter after the aggregation or sintering does not exceed the predetermined value.

Alternatively, a composite thin film comprising the metal oxide and transparent additive component may be prepared by forming a porous thin film comprising the metal oxide particles by means of oblique sputtering deposition, the above-mentioned thermal decomposition or the like, followed by applying a solution or a dispersion of the transparent additive component or a precursor thereof on the surface of the porous thin film, and then, when necessary, performing post-treatments such as drying, calcinating and the like. Alternatively, a composite thin film comprising the metal oxide and transparent additive component may be prepared by forming a porous thin film comprising the transparent additive component particles by means of oblique sputtering deposition, the above-mentioned thermal decomposition or the like, followed by applying a solution or a dispersion of the metal oxide particles or a precursor thereof on the surface of the porous thin film, and then, when necessary, performing post-treatments such as drying, calcinating and the like.

In the case where the transparent additive component is an organic polymer material, for example, a solid-state composite thin film is obtainable by mixing a metal oxide precursor solution or a metal oxide particle dispersion with a solution of the organic polymer material or a precursor thereof, applying the mixture on a transparent substrate and, when necessary, allowing the mixture to react, followed by drying and removing the solvent therefrom. In this case, the solvent for the transparent additive component is not limited, but can be selected from an organic solvent such as chloroform, water or the like, depending on the solubility of the metal oxide precursor, dispersibility of the metal oxide, solubility of the transparent organic polymer and so on.

As a method for fixing the metal oxide in pores of the porous transparent substrate ($SiO_2$-based soda-lime glass, quartz glass, acrylic polymer, etc.), there may be employed a method wherein a transparent substrate is impregnated with a metal oxide particle dispersion or a metal oxide precursor solution which generates a metal oxide by thermal decomposition, and then dried, followed by heating in an atmosphere containing oxygen (typically, at about 300 to about 800° C., for about 30 minutes to about 4 hours, no precipitant such as a compound which discharges a hydrogen ion by hydrolysis is required in this method); a method wherein a metal oxide particle dispersion or a metal oxide precursor solution which generates a metal oxide by thermal decomposition is applied on the porous substance, followed by thermal decomposition (typically, heated in an oxidizing atmosphere such as an air atmosphere, at about 300 to about 800° C., for about 40 minutes to about 4 hours, preferably about 30 minutes to about 4 hours); a method wherein a metal oxide particle dispersion is directly applied on the porous substrate by spin coating, dip coating, spray coating or the like, followed by drying, calcinating, etc. or like methods.

Examples of the metal oxide precursor to be used for producing the optical power limiting material of the present invention include metal alkoxides such as vanadylisopropoxide and vanadylethoxide; metal nitrates such as manganese nitrate, cobalt nitrate, ferrous nitrate and copper nitrate; metal chlorides such as niobium chloride, antimony chloride, tantalum chloride, tungsten chloride, rhenium chloride, osmium chloride and iridium chloride; organic acid metal salts such as vanadium octylate (=vanadium 2-ethylhexanate), cobalt octylate, iron octylate, manganese octylate, nickel octylate, chromium naphthenate, copper naphthenate, titanyl acetylacetonate, zinc octylate, molybdenyl acetylacetonate, ruthenium acetylacetonate, indium octylate, tin octylate and bismuth octylate; commercially-available organic tungsten compounds; commercially-available organic iridium compounds and the like.

A content of the metal oxide or the precursor thereof in the solution/dispersion of the metal oxide or the precursor may typically be, as a metal, about 0.1 to about 50 wt. %, preferably about 0.5 to about 10 wt. %, with respect to the whole solution/dispersion.

Both of a vertical sputtering deposition and an oblique sputtering deposition may be employed as the sputtering deposition method for producing the optical power limiting material of the present invention. When optionally adding the transparent additive component, there may be employed a simultaneous or alternative sputtering of a metal oxide/a precursor of the metal oxide and a transparent additive component/a precursor of the transparent additive component.

Post-treatments may be performed for diminishing loss of incident light caused by light scattering due to voids remaining in a porous substance and for achieving high transmittance for weak incident light which is required for an optical power limiting material. In the case of using a porous glass substrate, examples of the post-treatments include a heat treatment of a resulting material in an oxidizing atmosphere such as an air atmosphere, at a temperature of about 600° C. or more, for about 30 minutes to about 4 hours.

The optical power limiting material of the present invention may suitably used as a light shutter, a light fuse and so on. For example, the optical power limiting material may be used as a light shutter, a light fuse or the like by making light incident directly to the material. Alternatively, the optical power limiting material may be located in the vicinity of a focal point of a condenser lens for condensing incident light. The incident light intensity at the position of the optical power limiting material can be increased by condensing the incident light using the condenser lens; therefore, a good optical power limiting effect can be achieved even when the incident light having low intensity as compared with the effect achieved by irradiating the incident light directly onto the thin film. Moreover, the optical power limiting effect and a threshold value of the incident light intensity, at which the optical power limiting effect increases prominently, can be controlled by adjusting the condensation of the incident light using the condenser lens even when using only one optical power limiting material.

According to the present invention, there is provided an excellent optical power limiting material which has the following properties:

(i) exhibiting a good optical power limiting effect reversibly with respect to incident light intensity,
(ii) barely suffering from damages caused by an extremely strong incident laser beam,
(iii) maintaining the optical power limiting effect for a long period of time,
(iv) being excellent in heat stability, chemical stability and mechanical strength, and
(v) production thereof being simple and economical.

The optical power limiting material of the present invention is increased in light absorbance, i.e. decreased in light transmission, with the increase in irradiated light intensity, thereby to exert an action of transmitting light well without decreasing light intensity when weak light is made incident thereto, while significantly decreasing light intensity when strong light is made incident thereto.

Owing to such action, the optical power limiting material of the present invention exhibits a so-called optical power limiting effect, i.e., an effect of controlling the transmitted light intensity under a certain level in the case where lights of various intensities are made incident thereto.

Since many of the metal oxide semiconductors are increased in carrier concentration, which triggers the light absorption in the ultraviolet-visible-near infrared region with the rise in temperature, the optical power limiting material of the present invention advantageously exhibits the optical power limiting effect by making use of the increase in light absorption with the temperature rise which occurs when the material absorbs the incident light.

The optical power limiting material comprising the transparent additive component in addition to the transparent substrate and metal oxide can shorten the time for the metal oxide to be exposed to a high temperature even when a laser beam having a strong intensity is irradiated thereon. This is because the heat generated in the metal oxide is readily conducted to or diffused in the transparent additive component, thereby to suppress an excessive temperature rise which causes sublimation or peeling from the substrate of the metal oxide even when a pulsed laser beam having a wide pulse duration or a continuously oscillated laser beam is made incident thereto. Thus, the composite thin film containing the transparent additive component in addition to the metal oxide is unsusceptible to damages otherwise caused by the irradiation of strong laser beam and is excellent in heat stability as compared with the film containing the metal oxide only.

EXAMPLES

While the present invention will hereinafter be described in detail with reference to the following examples, the examples are not limitative of the invention.

Example 1

A vanadium octylate film was formed by spin coating on one side of a soda-lime glass substrate (thickness: 0.1 mm) comprising $SiO_2$ as a main component, Na, Ca and so on using vanadium octylate solution (solvent: toluene; content of vanadium octylate in the solution: 2% as a weight ratio of the metal to the whole solution), and then the film was heated in an air atmosphere at a temperature of 380° C. for 2 hours to give an orange-brown vanadium oxide ($V_2O_5$) thin film (thickness: about 600 nm). A laser beam having a wavelength of 532 nm and a pulse duration of 35 ps was made incident to the vanadium oxide thin film and intensity of the incident laser beam ($I_o$) was varied by using a condenser lens and ND filters in order to observe, by means of a streak camera, changes in transmittance of the vanadium oxide thin film occurring from immediately after the incidence of the laser beam to a several tens of picoseconds. A nonlinear absorption coefficient ($\beta$) was estimated from relationship between $I_o$ and the transmittance. It was found that the transmittance of the vanadium oxide thin film is remarkably decreased with the increase in $I_o$, especially when $I_o > 1$ $MW/cm^2$ (see FIG. 1).

In FIG. 1, the ordinate expresses the relative transmittance which is normalized by setting as 1 the transmittance of the weakest incident light in the measurements ($I_o \leq 160$ $W/cm^2$). Reduction in the transmittance was constant even when a number of irradiation of the pulsed laser was increased, while the transmittance slightly decreased when a relatively weak pulsed laser beam ($I_o \leq$ about 100 $kW/cm^2$) was made incident to the film.

The vanadium oxide thin film obtained above had $\beta$ of $2.5 \times 10^{-5}$ cm/W, and it was revealed that the film has excellent properties as an optical power limiting material. The excellent optical power limiting properties were maintained even when an extremely strong pulsed laser beam ($10^8$ $W/cm^2$) was irradiated thereon for 1,000 times. Thus, it is apparent that the vanadium oxide thin film barely suffers from damages caused by an extremely strong incident laser beam. It was revealed that the vanadium oxide thin film is excellent in long-term stability from the fact that the properties thereof were maintained the same after 6 months from the production. It was confirmed that the vanadium oxide thin film is excellent in thermal stability from the fact that no degradation was confirmed with the film after a heat treatment at 300° C. for 2 hours. It is apparent that the vanadium oxide thin film is excellent in chemical stability since no change in the properties was observed even after retaining the film in an atmosphere of 1% of $H_2$ or CO. Further, the cost of the source materials was not more than 40 yen per gram, thus to achieve not only low production cost, but also low material cost.

Example 2

One side of a glass substrate having the same composition and thickness as those in Example 1 was coated with an iron octylate film by spin coating using iron octylate solution (solvent: toluene; content of the iron octylate in the solution: 6 % as a weight ratio of the metal to the whole solution), and then calcinated in an air atmosphere at a temperature of 380° C. for 2 hours, thereby to give a reddish orange iron oxide ($Fe_2O_3$) thin film (thickness: about 800 nm). A laser beam having a wavelength of 532 nm and a pulse duration of 35 ps was made incident to the iron oxide thin film, and intensity of the incident laser beam ($I_o$) was varied using a condenser lens and ND filters in order to observe, by means of a streak camera, changes in transmittance of the iron oxide thin film occurring from immediately after the incidence of the laser beam to a several tens of picoseconds. A nonlinear absorption coefficient ($\beta$) was estimated from relationship between $I_o$ and the transmittance. It was found that the transmittance of the iron oxide thin film is remarkably decreased with the increase in $I_o$, especially when $I_o > 10$ $MW/cm^2$ (see FIG. 2).

Figure 2:
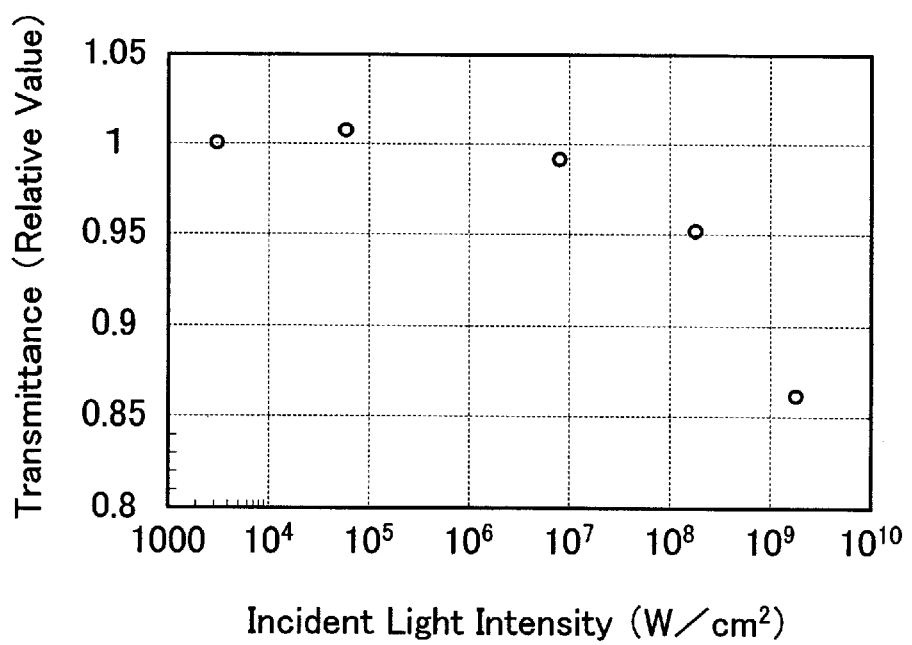
FIG. 2 shows relationship between intensity of an incident laser beam and transmission of the thin film prepared in Example 2 of the present invention in the case of irradiating a laser beam having a wavelength of 532 nm and a pulse duration of 35 ps onto the thin film.

In FIG. 2, the ordinate expresses the relative transmittance which is normalized by setting as 1 the transmittance of the weakest incident light in the measurements ($I_o = 3.1$ $kW/cm^2$). Reduction in the transmittance was constant even when a number of irradiation of the pulsed laser was increased, while the transmittance slightly decreased when a relatively weak pulsed laser beam ($I_o \leq$ about 100 $kW/cm^2$) was made incident to the film.

The iron oxide thin film obtained above had $\beta$ of $1.8 \times 10^{-5}$ cm/W, and it was revealed that the film has excellent properties as an optical power limiting material. The excellent optical power limiting properties were maintained even when an extremely strong pulsed laser beam ($10^8$ $W/cm^2$) was irradiated thereon for 1,000 times. Thus, it is apparent that the iron oxide thin film barely suffers from damages caused by the extremely strong incident laser beam. It was revealed that the iron oxide thin film is excellent in long-term stability from the fact that the properties thereof were maintained the same after 6 months from the production. It was confirmed that the iron oxide thin film is excellent in thermal stability from the fact that no degradation was confirmed with the film after a heat treatment at 300° C. for 2 hours. It is apparent that the iron oxide thin film is excellent in chemical stability since no change in the properties was confirmed even after retaining the film in an atmosphere of 1% of $H_2$ or CO. Further, the cost of the source materials was not more than 20 yen per gram, thus to achieve not only low production cost, but also low material cost.

Example 3

On one side of a glass substrate having the same composition and thickness as those in Example 1, a cobalt octylate film was formed by spin coating using cobalt octylate solution (solvent: toluene:butanol=1:1; content of cobalt octylate in the solution: 4% as a weight ratio of the metal to the whole solution), and then heated in an air atmosphere at a temperature of 380° C. for 2 hours, thereby to give a brown cobalt oxide ($Co_3O_4$) thin film (thickness: about 800 nm). A laser beam having a wavelength of 532 nm and a pulse duration of 35 ps was made incident to the cobalt oxide thin film, and intensity of the incident laser beam ($I_o$) was varied using a condenser lens and ND filters in order to observe, by means of a streak camera, changes in transmittance of the cobalt oxide thin film occurring from immediately after the incidence of the laser beam to a several tens of picoseconds. A nonlinear absorption coefficient ($\beta$) was estimated from relationship between $I_o$ and the transmittance. It was found that the transmittance of the cobalt oxide thin film is remarkably decreased with the increase in $I_o$, especially when $I_o > 50$ $MW/cm^2$ (see FIG. 3).

Figure 3:
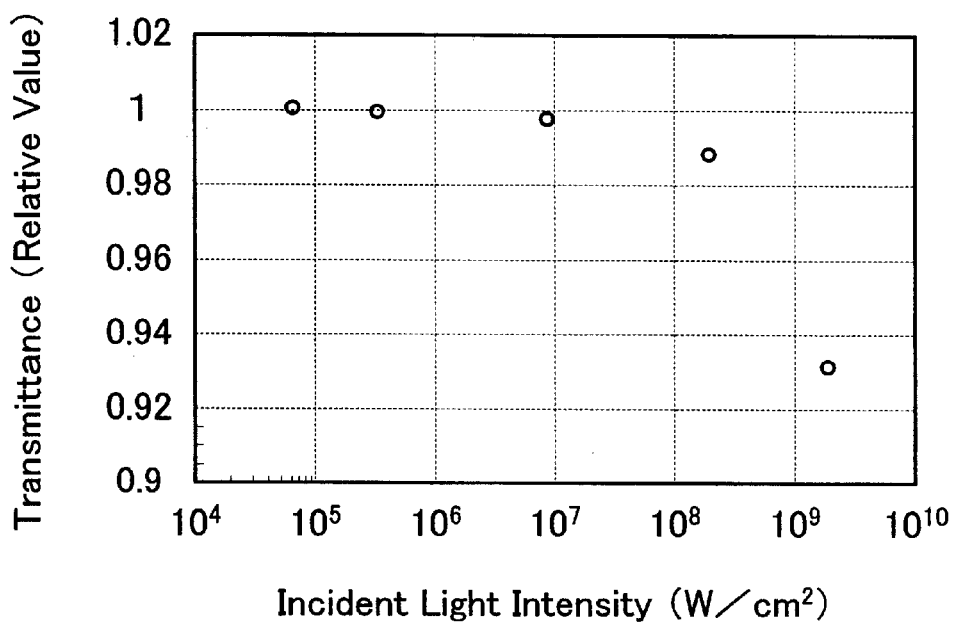
FIG. 3 shows relationship between intensity of an incident laser beam and transmission of the thin film prepared in Example 3 of the present invention in the case of irradiating a laser beam having a wavelength of 532 nm and a pulse duration of 35 ps onto the thin film.

In FIG. 3, the ordinate expresses the relative transmittance which is normalized by setting as 1 the transmittance of the weakest incident light in the measurements ($I_o = 60.8$ $kW/cm^2$). Reduction in the transmittance was constant even when the number of irradiation of the pulsed laser was increased, while the transmittance slightly decreased when a relatively weak pulsed laser beam ($I_o =$ about $10^5$ to $10^7$ $W/cm^2$) was made incident to the film.

The cobalt oxide thin film obtained above had $\beta$ of $1.5 \times 10^{-5}$ cm/W, and it was revealed that the film has excellent properties as an optical power limiting material. The excellent optical power limiting properties were maintained even when an extremely strong pulsed laser beam ($10^8$ $W/cm^2$) was irradiated thereon for 1,000 times. Thus, it is apparent that the cobalt oxide thin film barely suffers from damages caused by the extremely strong incident laser beam. It was revealed that the cobalt oxide thin film is excellent in long-term stability from the fact that the properties thereof were maintained the same after 6 months from the production. It was confirmed that the cobalt oxide thin film is excellent in thermal stability from the fact that no degradation was confirmed with the film after a heat treatment at 300° C. for 2 hours. It is apparent that the cobalt oxide thin film is excellent in chemical stability since no change in the properties was confirmed even after retaining the film in an atmosphere of 1% of $H_2$ or CO. Further, the cost of the source materials is not more than 20 yen per gram, thus to achieve not only low production cost, but also low material cost.

Example 4

On one side of a glass substrate having the same composition and thickness as those in Example 1, a brown cobalt oxide ($Co_3O_4$) thin film (thickness: about 400 nm) was formed by magnetron RF sputtering (target: $Co_3O_4$). A laser beam having a wavelength of 532 nm and a pulse duration of 35 ps was made incident to the cobalt oxide thin film, and intensity of the incident laser beam ($I_o$) was varied using a condenser lens and ND filters in order to observe, by means of a streak camera, changes in transmittance of the cobalt oxide thin film. A nonlinear absorption coefficient ($\beta$) was estimated from relationship between $I_o$ and the transmittance. It was found that the transmittance of the cobalt oxide thin film is remarkably decreased with the increase in $I_o$, especially when $I_o > 50$ $MW/cm^2$ (see FIG. 4).

Figure 4:
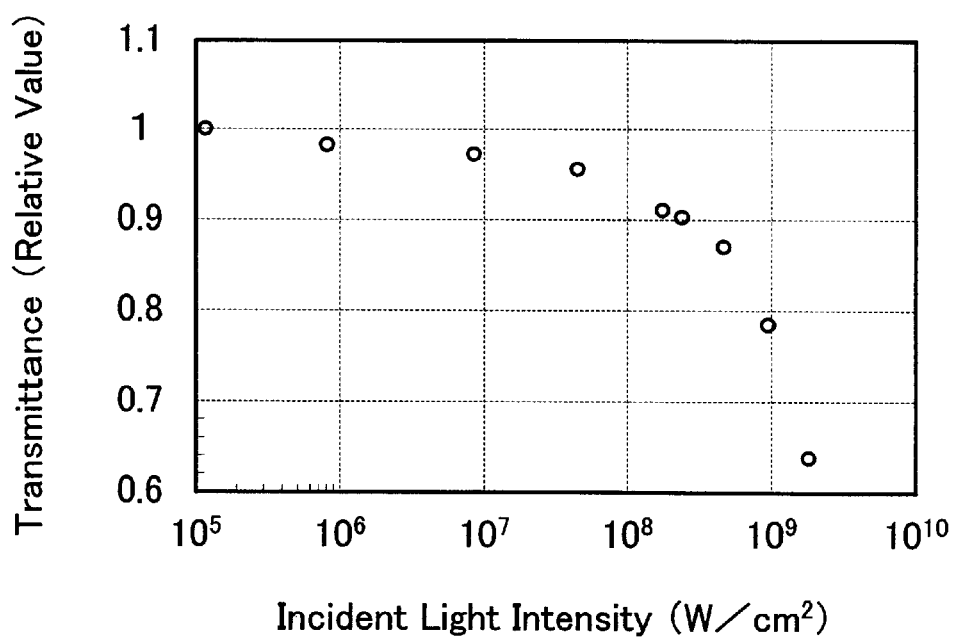
FIG. 4 shows relationship between intensity of an incident laser beam and transmission of the thin film prepared in Example 4 of the present invention in the case of irradiating a laser beam having a wavelength of 532 nm and a pulse duration of 35 ps onto the thin film.

In FIG. 4, the ordinate expresses the relative transmittance which is normalized by setting as 1 the transmittance of the weakest incident light in the measurements ($I_o = 112$ $kW/cm^2$). Reduction in the transmittance was constant even when a number of irradiation of the pulsed laser was increased, while the transmittance slightly decreased when a relatively weak pulsed laser beam ($I_o =$ about $10^5$ to $10^6$ $W/cm^2$) was made incident to the film.

The cobalt oxide thin film obtained above had $\beta$ of $2.5 \times 10^{-5}$ cm/W, and it was revealed that the film has excellent properties as an optical power limiting material. The excellent optical power limiting properties were maintained even when an extremely strong pulsed laser beam ($10^8$ $W/cm^2$) was irradiated thereon for 1,000 times. Thus, it is apparent that the cobalt oxide thin film barely suffers from damages caused by the extremely strong incident laser beam. It was revealed that the cobalt oxide thin film is excellent in long-term stability from the fact that the properties thereof were maintained the same after 6 months from the production. It was confirmed that the cobalt oxide thin film is excellent in thermal stability from the fact that no degradation was confirmed with the film after a heat treatment at 300° C. for 2 hours. It is apparent that the cobalt oxide thin film is excellent in chemical stability since no change in the properties was confirmed even after retaining the film in an atmosphere of 1% of $H_2$ or CO.

Example 5

On one side of a glass substrate having the same composition and thickness as those in Example 1, a copper naphthenate film was formed by spin coating using copper naphthenate solution (solvent: toluene; content of copper naphthenate in the solution: 5% as a weight ratio of the metal to the whole solution), and then calcinated in an air atmosphere at a temperature of 380° C. for 2 hours, thereby to give a brown copper oxide (CuO) thin film (thickness: about 800 nm). A laser beam having a wavelength of 532 nm and a pulse duration of 35 ps was made incident to the copper oxide thin film, and intensity of the incident laser beam ($I_o$) was varied using a condenser lens and ND filters in order to observe, by means of a streak camera, changes in transmittance of the copper oxide thin film. A nonlinear absorption coefficient ($\beta$) was estimated from relationship between $I_o$ and the transmittance. It was found that the transmittance of the copper oxide thin film is remarkably decreased with the increase in $I_o$, especially when $I_o > 10$ MW/cm$^2$ (see FIG. 5).

Figure 5:
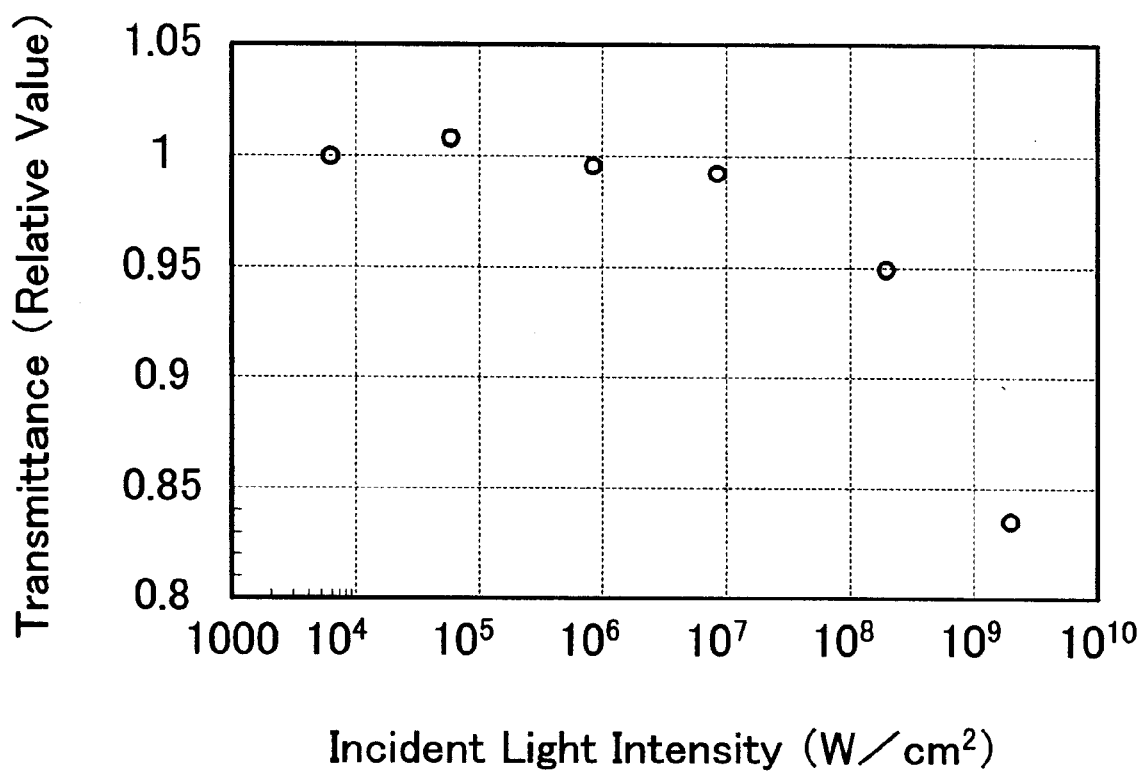
FIG. 5 shows relationship between intensity of an incident laser beam and transmission of the thin film prepared in Example 5 of the present invention in the case of irradiating a laser beam having a wavelength of 532 nm and a pulse duration of 35 ps onto the thin film.

In FIG. 5, the ordinate expresses the relative transmittance which is normalized by setting as 1 the transmittance of the weakest incident light in the measurements ($I_o$=6.08 kW/cm$^2$). Reduction in the transmittance was constant even when a number of irradiation of the pulsed laser was increased, while the transmittance slightly decreased when a relatively weak pulsed laser beam ($I_o$=about $10^4$ to $10^6$ W/cm$^2$ was made incident to the film.

The copper oxide thin film obtained above had $\beta$ of $1.8 \times 10^{-5}$ cm/W, and it was revealed that the film has excellent properties as an optical power limiting material. The excellent optical power limiting properties were maintained even when an extremely strong pulsed laser beam ($10^8$ W/cm$^2$) was irradiated thereon for 1,000 times. Thus, it is apparent that the copper oxide thin film barely suffers from damages caused by the extremely strong incident laser beam. It was revealed that the copper oxide thin film is excellent in long-term stability from the fact that the properties thereof were maintained the same after 6 months from the production. It was confirmed that the copper oxide thin film is excellent in thermal stability from the fact that no degradation was confirmed with the film after a heat treatment at 300° C. for 2 hours. It is apparent that the copper oxide thin film is excellent in chemical stability since no change in the properties was confirmed even after retaining the film in an atmosphere of 1% of $H_2$ or CO. Further, the cost of the source materials is not more than 20 yen per gram, thus to achieve not only low production cost, but also low material cost.

Example 6

On one side of a glass substrate having the same composition and thickness as those in Example 1, a thin film was formed by using a commercially available organic iridium compound solution (solvent: alcohol mixture; content of the organic iridium in the solution: 2% as a weight ratio of the metal to the whole solution), and then heated in an air atmosphere at a temperature of 550° C. for 2 hours, thereby to give a blue-gray iridium oxide ($IrO_2$) thin film (thickness: about 1.2 $\mu$m). A laser beam having a wavelength of 532 nm and a pulse duration of 35 ps was made incident to the iridium oxide thin film, and intensity of the incident laser beam ($I_o$) was varied using a condenser lens and ND filters in order to observe, by means of a streak camera, changes in transmittance of the iridium oxide thin film occurring from immediately after the incidence of a laser beam to a several tens of picoseconds. From the fact that the transmittance of the iridium oxide thin film was remarkably decreased with the increase in $I_o$, especially when $I_o > 10$ MW/cm$^2$, it was confirmed that the film has the properties required for an optical power limiting material.

Example 7

On one side of a glass substrate having the same composition and thickness as those in Example 1, a composite film of calcium octylate and vanadium octylate was formed by spin coating (solvent: toluene:butanol=1:1; content of the mixture of calcium octylate and vanadium octylate in the solution: 2% as a molar ratio of the metals to the whole solution), and then calcinated in an air atmosphere at a temperature of 380° C. for an hour, thereby to give an orange-brown $CaV_2O_5$ thin film (thickness: about 1 $\mu$m). A laser beam having a wavelength of 532 nm and a pulse duration of 35 ps was made incident to the $CaV_2O_5$ thin film, and intensity of the incident laser beam ($I_o$) was varied using a condenser lens and ND filters in order to observe, by means of a streak camera, changes in transmittance of the $CaV_2O_5$ thin film occurring from immediately after the incidence of a laser beam to a several tens of picoseconds. Since the transmittance of the $CaV_2O_5$ thin film is remarkably decreased with the increase in the intensity of the incident laser beam, it was revealed that the film is excellent in properties required for an optical power limiting material.

Example 8

One side of a quartz glass substrate consisting of $SiO_2$ and having a thickness of 1 mm was coated with a composite film of bismuth octylate and vanadium octylate by spin coating using a solution containing bismuth octylate and vanadium octylate (solvent: toluene; content of the mixture of bismuth octylate and vanadium octylate in the solution: 2% as a weight ratio of the metals to the whole solution; molar ratio of bismuth octylate to vanadium octylate=1:1 as a molar ratio of the metals), and then heated in an air atmosphere at a temperature of 380° C. for 2 hours, thereby to give a yellow $BiVO_4$ thin film (thickness: about 1 $\mu$m). A laser beam having a wavelength of 532 nm and a pulse duration of 35 ps was made incident to the $BiVO_4$ thin film, and intensity of the incident laser beam ($I_o$) was varied using a condenser lens and ND filters in order to observe, by means of a streak camera, changes in transmittance of the $BiVO_4$ thin film occurring from immediately after the incidence of a laser beam to a several tens of picoseconds. Since the transmittance of the $BiVO_4$ thin film is remarkably decreased with the increase in the intensity of incident laser beam, it was revealed that the film has the properties required for an optical power limiting material.

Example 9

Bottom surface of a triquetrous prism comprising ZnSe, which has a side length of about 2 cm, was coated with a brown cobalt oxide ($Co_3O_4$) thin film (thickness: about 1.5 $\mu$m) by magnetron RF sputtering (target: $Co_3O_4$). A laser beam having a wavelength of 1064 nm and a pulse duration of 7 ns was made incident to the cobalt oxide thin film, and intensity of the incident laser beam ($I_o$) was varied using a condenser lens and ND filters in order to observe, by means of a photodiode, changes in transmittance of the cobalt oxide thin film occurring from immediately after the incidence of a laser beam to a several tens of nanoseconds. Since the transmittance of the cobalt oxide thin film is remarkably decreased with the increase in the intensity of incident laser beam, it was revealed that the film has the properties required for an optical power limiting material.

Example 10

A porous soda-lime glass substrate (having the same composition as that of the glass substrate used in Example 1) having a thickness of 1 mm, mean pore diameter of 4 nm, porosity of 28% and specific surface area of 200 $m^2$/g was impregnated with a toluene-butanol (1:1) mixture solution of cobalt octylate (concentration of the solution =1% as a weight ratio of the metal to the whole solution). After that, the glass substrate was dried and then heated in an air atmosphere at a temperature of 380° C. for 2 hours, thereby to give a brown material wherein cobalt oxide is fixed in pores of the porous glass substrate (mean particle diameter of the cobalt oxide: 2 to 4 nm; fixed weight ratio: about 20 wt. %). A laser beam having a wavelength of 532 nm and a pulse duration of 35 ps was made incident to the cobalt oxide particles-containing porous glass substrate. Intensity of the incident laser beam was varied using a condenser lens and ND filters in order to observe, by means of a streak camera, changes in transmittance of the cobalt oxide particles-containing porous glass substrate occurring from immediately after the incidence of a laser beam to a several tens of picoseconds. Since the transmittance of the cobalt oxide particles-containing porous glass substrate is remarkably decreased with the increase in the intensity of incident laser beam, it was revealed that the cobalt oxide particles-containing porous glass substrate has the properties required for an optical power limiting material.

Example 11

A porous soda-lime glass substrate (having the same thickness, composition, mean pore diameter, porosity and specific surface area as those of the glass substrate used in Example 10) was impregnated with a mixture of an ethanol solution of 5% manganese nitrate and an ethanol solution of 5% of cobalt nitrate (molar ratio of the metals=2:1). After that, the glass substrate was dried and then heated in an air atmosphere at a temperature of 380° C. for 2 hours, thereby to give a brown material wherein manganese-cobalt composite oxide ($MnCo_2O_4$) is fixed in pores of the porous glass substrate (mean particle diameter of $MnCo_2O_4$: 2 to 4 nm; fixed weight ratio: about 20 wt. %). A laser beam having a wavelength of 532 nm and a pulse duration of 35 ps was made incident to the manganese-cobalt composite oxide particles-containing porous glass substrate, and intensity of the incident laser beam was varied using a condenser lens and ND filters in order to observe, by means of a streak camera, changes in transmittance of the manganese-cobalt composite oxide particles-containing porous glass substrate occurring from immediately after the incidence of a laser beam to a several tens of picoseconds. Since the transmittance of the manganese-cobalt composite oxide particles-containing porous glass substrate is remarkably decreased with the increase in the intensity of incident laser beam, it was revealed that the manganese-cobalt composite oxide particles-containing porous glass substrate has the properties required for an optical power limiting material.

Example 12

On one side of a glass substrate having the same composition and thickness as those in Example 1, a copper naphthenate thin film was formed by spin coating using copper naphthenate solution (solvent: toluene; content of copper naphthenate in the solution: 5% as a weight ratio of the metal to the whole solution), and then calcinated in an air atmosphere at a temperature of 380° C. for 2 hours, thereby to give a brown copper oxide (CuO) porous thin film (particle size: about 20 to 40 nm, thickness: about 1 $\mu$m). On the surface of the porous copper oxide thin film, zirconium octylate was applied by spin coating using zirconium octylate solution (solvent: toluene; content of zirconium octylate in the solution: 1% as a weight ratio of the metal to the whole solution), and then calcinated in an air atmosphere at a temperature of 380° C. for 2 hours thereby to give a brown copper oxide-zirconium oxide composite thin film (thickness of about 1 $\mu$m) wherein space between the copper oxide (CuO) particles are filled with zirconium oxide ($ZrO_2$). A laser beam having a wavelength of 532 nm and a pulse duration of 35 ps was made incident to the composite thin film, and intensity of the incident laser beam ($I_o$) was varied using a condenser lens and ND filters in order to observe, by means of a streak camera, changes in transmittance of the composite thin film occurring from immediately after the incidence of a laser beam to a several tens of picoseconds. A nonlinear absorption coefficient ($\beta$) was estimated from the relationship between $I_o$ and the transmittance. From the fact that the transmittance of the composite thin film was remarkably decreased with the increase in $I_o$, it was revealed that the composite thin film is excellent in the properties required for an optical power limiting material.

The excellent optical power limiting properties of the copper oxide-zirconium oxide composite thin film are maintained even when an extremely strong pulsed laser beam ($10^{10}$ W/cm) was continuously irradiated thereon, thus to reveal that the composite thin film barely suffers from damages caused by incidence of an extremely strong laser beam.

In contrast, a porous copper oxide thin film which was not composited with zirconium oxide was gradually damaged by the continuous irradiation of the extremely strong pulsed laser beam ($10^{10}$ W/cm) and was gradually degraded in the optical power limiting properties. The excellent optical power limiting properties of the porous copper oxide thin film are maintained even when a strong pulsed laser beam ($10^8$ W/cm) was continuously irradiated thereon.

From the results obtained above, it is apparent that the optical power limiting properties of the copper oxide thin film are remarkably improved by compositing with the transparent zirconium oxide.

Further, a glass substrate whereon formed is a porous thin film of copper oxide particles obtained by the same method as described above was impregnated with a chloroform solution of polymethylmethacrylate and then dried to give a copper oxide-polymethylmethacrylate composite thin film. The copper oxide-polymethylmethacrylate composite thin film exhibited a high stability with respect to an extremely high laser beam like the copper oxide-zirconium oxide composite thin film.

What is claimed is:

1. An optical power limiting material comprising a transparent substrate and an oxide of at least one metal selected from the group consisting of Ti, V, Cr, Mn, Fe, Co, Ni, Cu, Zn, Nb, Mo, Ru, In, Sn, Sb, Ta, W, Re, Os, Ir and Bi,
   wherein the oxide of vanadium is not $VO_2$; and
   wherein the oxide of zinc is not ZnO.

2. The optical power limiting material according to claim 1, wherein the transparent substrate is at least one material selected from the group consisting of glass, $SiO_2$, $Al_2O_3$, ZnO, $ZrO_2$, ZnSe and quartz.

3. The optical power limiting material according to claim 2, wherein the transparent substrate is at least one material selected from the group consisting of $SiO_2$, $Al_2O_3$ and $ZrO_2$.

4. The optical power limiting material according to claim 1, wherein the transparent substrate is a porous substrate.

5. The optical power limiting material according to claim 1, wherein the transparent substrate is at least one material selected from the group consisting of an acrylic resin, a polycarbonate resin, a polystyrene resin and a polyvinyl resin.

6. The optical power limiting material according to claim 1, wherein the metal oxide is at least one material selected from the group consisting of TiO, $Ti_2O_3$, $TiO_2$, VO, $V_2O_3$, $V_2O_5$, CrO, $Cr_2O_3$, $CrO_2$, $Cr_2O_5$, $CrO_3$, $CrO_5$, MnO, $Mn_3O_4$, $Mn_2O_3$, $MnO_2$, $MnO_3$, $Mn_2O_7$, FeO, $Fe_3O_4$, $Fe_2O_3$, CoO, $Co_2O_3$, $Co_3O_4$, $CoO_2$, NiO, $Ni_3O_4$, $Ni_2O_3$, $NiO_2$, $Cu_2O$, CuO, NbO, $Nb_2O_3$, $NbO_2$, $Nb_2O_5$, MoO, $Mo_2O_3$, $MoO_2$, $Mo_2O_5$, $MoO_3$, RuO, $Ru_2O_3$, $RuO_2$, $RuO_4$, $In_2O$, $In_2O_3$, SnO, $SnO_2$, $Sb_2O_3$, $Sb_2O_4$, $Sb_2O_5$, $TaO_2$, $Ta_2O_3$, $Ta_2O_5$, $WO_2$, $W_2O_5$, $WO_3$, $Re_2O$, ReO, $Re_2O_3$, $ReO_2$, $Re_2O_5$, $ReO_3$, $Re_2O_7$, OSO, $OS_2O_3$, $OSO_2$, $OSO_3$, $OSO_4$, $Ir_2O_3$, $IrO_2$, BiO, $Bi_2O_3$ and $Bi_2O_5$.

7. An optical power limiting material comprising a transparent substrate and an oxide of at least one metal selected from the group consisting of Ti, V, Cr, Mn, Fe, Co, Ni, Cu, Zn, Nb, Mo, Ru, In, Sn, Sb, Ta, W, Re, Os, Ir and Bi, wherein the oxide of vanadium is not $VO_2$, wherein the metal oxide is at least one composite oxide selected from the group consisting of $XCr_2O_4$, wherein X=Mg, Zn, Cu, Mn, Fe, Co, or Ni, $Na_2SnO_3$, $Pb_2SnO_4$, $Bi_2Sn_2O_7$, $Na_3VO_4$, $MVO_4$, wherein M=Nd, Sm, Eu, Y, Fe, or Cr, $VOMoO_4$, $MV_2O_4$, wherein M=Mg, Mn, Co, Zn, or Cu, $VM_2O_4$, wherein M=Mg, Co, or Zn, $VMn_2O_4$, $V_2MoO_8$, $A_xV_2O_5$, wherein 0<x<1, A=Li, K, Na, Cu, Ag, Ca, Cd, or Pb, $ZrV_2O_7$, $MVO_3$, wherein M=K, Fe, Ti, Cr, Ni, Mg, Ca, La, Y, or Sc, $H_4(PMo_{11}VO_{40})$, $H_5(PMo_{10}V_2O_{40})$, $H_6(PMo_9V_3O_{40})$, $H_4(PW_{11}VO_{40})$, $H_6(PW_6V_3O_{41})$, $Bi_2O_3 \cdot xMoO_3$, wherein x=4, 3, 2, 1, ½, ⅓, or ⅒, $Bi_2O_3 \cdot xWO_3$, wherein x=2–3, 1, ½ to ⅕, or ⅒, $xBi_2O_3 \cdot Sb_2O_5$, wherein x=1, 3, $Bi_9PMo_{12}O_{52}$, $Fe_2(MoO_4)_3$, $(MoO_3)_{1.0}(Cr_2O_3)_{0.75}$, $A_xWO_3$, wherein 0<x<1, A=H, Li, K, Na, Rb, Ca, Cu, Ag, In, Tl, Sn, Pb, or rare earth element, $LiTi_2O_4$, $MnCo_2O_4$, $NiCo_2O_4$ and $NiMnCo_4O_8$.

8. The optical power limiting material according to claim 1, wherein the metal oxide forms a thin film on a surface of the transparent substrate in the form of particles having a mean particle diameter of not more than 1 μm.

9. An optical power limiting material comprising a transparent substrate and an oxide of at least one metal selected from the group consisting of Ti, V, Cr, Mn, Fe, Co, Ni, Cu, Zn, Nb, Mo, Ru, In, Sn, Sb, Ta, W, Re, Os, Ir and Bi, wherein the oxide of vanadium is not $VO_2$, and wherein the metal oxide forms a thin film on a surface of the transparent substrate in the form of particles having a mean particle diameter of not more than 1 μm, and a ratio of a number of metal atoms in the metal oxide to a number of non-oxygen atoms in the oxide comprised in the transparent substrate or a number of monomer units composing a polymer ranges from 1:1 to 1:100.

10. The optical power limiting material according to claim 1, wherein the metal oxide is dispersed in the transparent substrate in the form of particles having a mean particle diameter of not more than 1 μm.

11. An optical power limiting material comprising a transparent substrate and an oxide of at least one metal selected from the group consisting of Ti, V, Cr, Mn, Fe, Co, Ni, Cu, Zn, Nb, Mo, Ru, In, Sn, Sb, Ta, W, Re, Os, Ir and Bi, wherein the oxide of vanadium is not $Vo_2$, and wherein the metal oxide is dispersed in the transparent substrate in the form of particles having a mean particle diameter of not more than 1 μm, and a ratio of a number of metal atoms in the metal oxide to a number of non-oxygen atoms in the oxide comprised in the transparent substrate or a number of monomer units composing a polymer ranges from 1:1 to 1:100.

12. The optical power limiting material according to claim 1, which further comprises a transparent additive component.

13. The optical power limiting material according to claim 12, wherein the transparent additive component is at least one material selected from the group consisting of $SiO_2$, $Al_2O_3$, $ZrO_2$, ZrO, ZnSe, an acrylic resin, a polycarbonate resin, a polystyrene resin and a polyvinyl resin.

14. The optical power limiting material according to claim 12, wherein the transparent additive component is at least one material selected from the group consisting of $SiO_2$, $Al_2O_3$, $ZrO_2$, an acrylic resin, a polycarbonate resin, a polystyrene resin and a polyvinyl resin.

15. A light shutter comprising the optical power limiting material according to claim 1.

16. The light shutter according to claim 15, wherein the optical power limiting material is located in the vicinity of a focal point of a condenser lens for condensing incident light.

17. A light fuse comprising the optical power limiting material according to claim 1.

18. The light fuse according to claim 17, wherein the optical power limiting material is located in the vicinity of a focal point of a condenser lens for condensing incident light.

19. A method of forming an optical power limiting material, said method comprising:
   forming a thin film of a metal oxide on a transparent substrate, wherein the metal oxide is an oxide of at least one metal selected from the group consisting of Ti, V, Cr, Mn, Fe, Co, Ni, Cu, Zn, Nb, Mo, Ru, In, Sn, Sb, Ta, W, Re, Os, Ir and Bi and wherein the transparent substrate is at least one material selected from the group consisting of glass, $SiO_2$, $Al_2O_3$, ZnO, $ZrO_2$, ZnSe, and quartz;
   wherein the oxide of vanadium is not $VO_2$; and
   wherein the oxide of zinc is not ZnO.

20. The method of claim 19, wherein the thin film comprises particles having a mean particle diameter of not more than 1 μm.

21. The method of claim 19, wherein the thin film is formed by a method selected from the group consisting of sputtering deposition, vacuum deposition, laser MBE, and chemical vapor deposition.

22. A method of forming an optical power limiting material, said method comprising:

forming a thin film of a metal oxide on a transparent substrate,
  wherein the metal oxide is an oxide of at least one metal selected from the group consisting of Ti, V, Cr, Mn, Fe, Co, Ni, Cu, Zn, Nb, Mo, Ru, In, Sn, Sb, Ta, W, Re, Os, Ir and Bi;
  wherein the transparent substrate is at least one material selected from the group consisting of glass, $SiO_2$, $Al_2O_3$, ZnO, $ZrO_2$, ZnSe, and quartz, and
  wherein the thin film is formed by applying a solution of a metal oxide precursor onto the transparent substrate and thermally decomposing said metal oxide precursor.

23. The method of claim 19, wherein the thin film is formed by applying a metal oxide particle dispersion onto the transparent substrate with a method selected from the group consisting of spin coating, dip coating, and spray coating.

24. The method of claim 23, wherein the metal oxide particles have a mean particle diameter of about 2 nm to about 1 $\mu$m.

25. The method of claim 23, wherein the metal oxide particles have a mean particle diameter of about 2 nm to about 100 nm.

\* \* \* \* \*